Feb. 13, 1934. H. H. GORDON 1,947,043
HEADLIGHT SYSTEM FOR AUTOMOTIVE VEHICLES
Filed Dec. 11, 1929
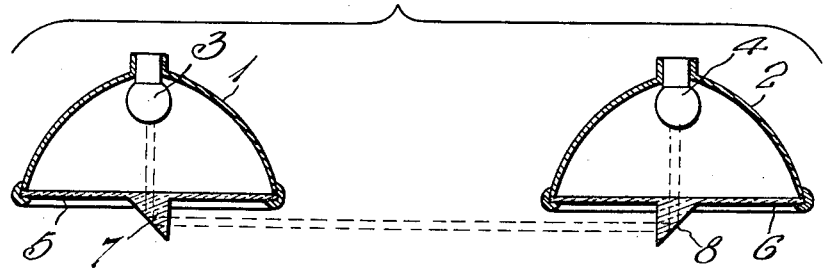
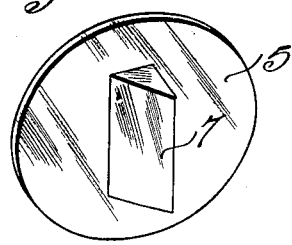
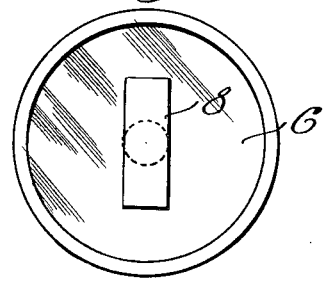
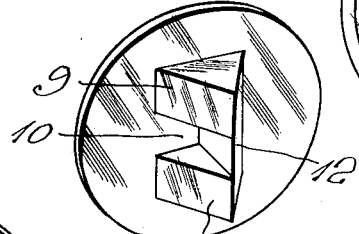
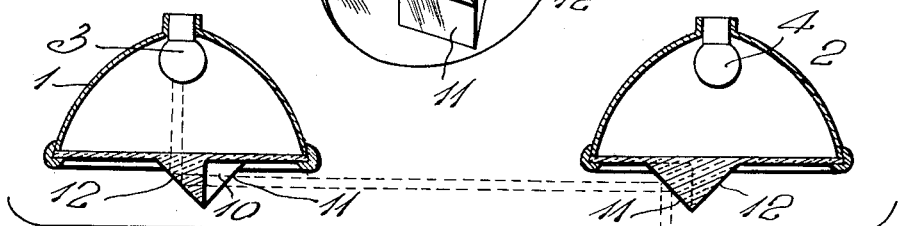
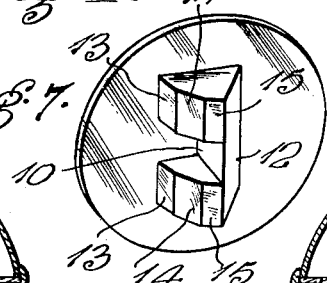
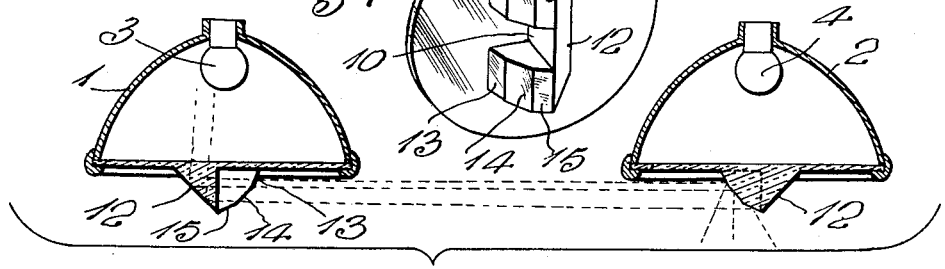
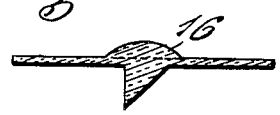
INVENTOR
HAYNER H. GORDON,
BY Elmer Stewart
ATTORNEY Patented Feb. 13, 1934

1,947,043

UNITED STATES PATENT OFFICE 1,947,043

HEADLIGHT SYSTEM FOR AUTOMOTIVE VEHICLES

Hayner H. Gordon, Washington, D. C., assignor, by direct and mesne assignments, to Lite Watchman Corporation, New York, N. Y., a corporation of Delaware Application December 11, 1929
Serial No. 413,296

5 Claims. (Cl. 240—7.1)

This invention relates to automobile headlights and is more particularly directed to an optical system pertaining thereto for projecting illuminating rays from each of a pair of headlights at all times when they are in operation, even when the bulb in one headlight has burned out.

When driving it is quite common to see automobiles with only one headlight burning of which fact the operator of the vehicle is usually unaware. In other instances, the driver may be aware that but one headlight is operating, but he may not be possessed of the tools to remove the front of the lamp or a new bulb to insert in lieu of the burned out one.

Driving under these conditions is dangerous both to the driver of this vehicle and to the drivers of approaching vehicles, as it is impossible to tell whether the one light signifies the approach of a motor-cycle or a car, and it is of course impossible to ascertain whether it is the right hand headlight or left hand headlight which is burning, and therefore impossible to determine or gauge the amount of clearance to be given the approaching vehicle.

It is an object of the present invention to provide an optical system for automotive headlights which will project light rays from both headlights, irrespective of the burning out of a bulb in either headlight.

It is a further object of the present invention to provide an optical system which will reflect a portion of the light emanating from either headlight toward the other headlight and then reflect or reproject it in forward direction.

Other objects will be apparent from the following detailed description of various embodiments of this invention as illustrated by the accompanying drawing:

In the drawing:—

Fig. 1 is a plan sectional view of a pair of automobile headlights embodying one form of this invention.

Figs. 2 and 3 are front and perspective views of the lens structure shown in Fig. 1.

Fig. 4 is a plan sectional view of a second embodiment of the invention.

Fig. 5 is a view of the form of lens used in the embodiment illustrated in Fig. 4.

Fig. 6 is a plan sectional view of a third embodiment of the invention.

Fig. 7 is a view of the form of lens used in the modification shown in Fig. 6.

Fig. 8 is a sectional view of the lens embodying another modification of the invention.

Referring to Figs. 1, 2 and 3 of the drawing, a pair of headlights is disclosed having reflecting surfaces 1 and 2 of any conventional form or design. These are provided with the usual sources of light 3 and 4. Located in front of the lamp, which may be of any standard construction, are lenses 5 and 6. Mounted in the center of the lens and preferably cast integral therewith are prismatic members 7 and 8. In the embodiment shown in Fig. 1 these prismatic members are formed of two surfaces, one of 90° to the plane of the lens and the other at 45°, the 90° surfaces of the prism 7 and 8 being located adjacent to or facing each other. By such an arrangement a beam of light emanating from either source of illumination is reflected by the 45° surface of its respective prism over against the 45° surface of the corresponding prism, and from thence into the interior of the other headlight. In normal operation both bulbs 3 and 4 are burning and each headlight throws its rays ahead for the purpose of illuminating the roadway and warning other vehicles of its approach. By way of example, if bulb 4 should now burn out, the reflecting surface of prism 7 will send a beam of rays from bulb 3 over against the reflecting surface of prism 8 and into the headlight 2, from which the beam will be reflected or projected forward and serve as a warning signal to approaching vehicles. The same action will take place if the lamp bulb 3 burns out, in that case light being reflected by the prism 8 over against the reflecting surface of prism 7 and into the headlight 1. The illumination produced by the reflected beam is not as intense as that produced by the direct light which it replaces, but the same is entirely sufficient as an emergency safety signal.

The embodiment shown in Figs. 4 and 5 comprises the use of a modified form of prism utilizing a combination of reflecting surfaces. By reference to Fig. 5 it will be seen that the prismatic member herein used comprises three sections, an upper section 9, a middle section 10, and a lower section 11. The face 12 of the prismatic member is a 45° face, as are the faces 9 and 11. The middle portion 10 is a 90° face with respect to the plane of the lens upon which the prism is fixed or formed. The lenses are located in the respective headlights with the 90°, said surfaces facing each other. In Fig. 4, in which a sectional plan view of the two lamps is shown, the section illustrating the left hand headlight is through the mid-portion of the prism, whereas the sectional view of the right hand headlight is one taken through the upper portion of the prism. The operation of this embodiment is similar to that described with reference to the embodiment of Figs. 1 and 2, in so far as the 90° mid-portion of the prism is concerned. The upper and lower portions of the prismatic member on the headlight, the lamp of which is out, however, perform the function of causing a direct outward reflection of a portion of the rays received by reflection from the opposite prism, these rays undergoing an approximate 45° reflection and being projected in a forward path as indicated by the dotted line in Fig. 4. This embodiment therefore not only produces an indirect reflection of rays from the interior of the extinguished headlight, by virtue of the double reflection from the opposite lamp over and into the reflector of the extinguished lamp, but in addition certain of the rays are directly projected forward from the reflecting surface of the prism in a path substantially identical with the path traversed by the normal beam of light projected from that headlight.

The embodiment disclosed in Figs. 6 and 7 is similar to that just described in connection with Figs. 4 and 5, with the exception that the outwardly reflected rays are directed in a diverged bundle instead of a substantially parallel path. This is obtained by constructing the upper and lower portion of the prismatic member with several facets of varying angles 13, 14 and 15. While the invention is not limited to any specific angular relationship or number of facets, one suitable form would have the one facet 13 of 40°, the middle facet 14 of 45°, and the outer facet 15 of 50° respective to the plane surface of the lens. The light rays projected over from the opposite prism of the lighted lamp will be reflected in various divergent paths as indicated by the dotted lines in Fig. 6. At the same time, the mid-portion of this prismatic member will function as described in connection with Figs. 1 and 2 and will by double reflection illuminate the interior of the lamp.

The prismatic members may be made separate from the lenses, and mounted or supported in front of the headlights, but they are preferably cast integral with the lens, and, if desired, the rear portion of the lens back of the prism may be formed with a convex portion 16 as shown in Fig. 8 so as to concentrate the beam of light and thereby render the rays more parallel in their passage from one prismatic member to the other. In order to accomplish this to the best advantage, the focal length of this convex portion should be substantially equivalent to the distance of the lamp filament from the lens.

The invention can of course be utilized with any of the various forms of light projecting lenses or reflectors now in use and it should also be understood that the invention is not limited to the location of the reflecting prism in the exact center of the light, as results will also be obtained if the prisms are offset and located at any convenient point between the edge and center of the lens.

The invention in its broadest embodiment comprehends the use of mirrors or total reflecting surfaces for the purpose above described, but the use of the prisms for reflecting surfaces possesses the advantage over mirrors having a total reflecting surface in that the 45° surfaces not only act to reflect the rays of light from one lamp to another, but in addition they are transparent to other rays of light impinging upon these surfaces from certain portions of the interior of the headlight.

The invention, while possessing the function of causing both headlights to appear to be illuminated when the lamp of one is burned out, possesses the additional function in that the prisms also act to distribute a beam of light at right angles to the normal forwardly projecting beams of light, the right hand headlight throwing a reflected beam to the left and vice versa. This causes a consequent side illumination which is extremely advantageous as regards safety when a vehicle approaches another at right angles as at an intersection.

Several embodiments of the invention have been described and it is to be understood that the same may be varied in substantial detail without departing from the spirit of the invention, as pointed out in the accompanying claims.

What I claim is:—

1. In a headlight system for automotive vehicles, the combination with a pair of headlights, of prismatic means formed on said headlight lenses for deflecting a beam of light from each headlight to the other and then reprojecting said light substantially parallel with the normal beam of light projected from the latter headlight.

2. In a headlight system for automotive vehicles, the combination with a pair of headlights, including lenses, a prismatic reflecting surface fixed on each lens at an angle of approximately 45° so as to reflect a portion of the light emanating from the respective headlight upon which it is mounted to the other reflecting surface and so arranged as to project light in a forward direction.

3. In a headlight system for automotive vehicles in combination with a pair of headlights, lenses for said headlights each having an integrally formed prismatic member projecting forward and formed with a transparent reflecting surface so located with reference to the axis of the beams of light enanating from the headlights as to reflect a portion of said light against the other prismatic member and reproject said light in a forward direction.

4. In a headlight system for automotive vehicles, the combination with a pair of headlights, including lenses, a prismatic member having a plurality of portions located in front of each lens, one of said portions being formed with a substantially 45° deflecting surface to deflect a ray of light emanating from the headlight upon which said prismatic member is mounted, toward the prismatic member of the other lens and having another portion formed to project forward a ray of light received from the other prismatic member.

5. In a headlight system for automotive vehicles, the combination with a pair of headlights, including lenses, a prismatic member having a plurality of portions located in front of each lens, one of said portions being formed with a substantially 45° deflecting surface to deflect a ray of light emanating from the headlight upon which said prismatic member is mounted toward the prismatic member of the other lens and having another portion formed with a plurality of facets to project forward a ray of light received from the other prismatic member.

HAYNER H. GORDON.